United States Patent
Pick et al.

(10) Patent No.: US 12,279,208 B2
(45) Date of Patent: Apr. 15, 2025

(54) MACHINE LEARNING (ML)-BASED DYNAMIC DEMODULATOR PARAMETER SELECTION

(71) Applicant: QUALCOMM Incorporated, San Diego, CA (US)

(72) Inventors: Jacob Pick, Beit Zayit (IL); Assaf Touboul, Netanya (IL); Shay Landis, Hod Hasharon (IL); Alexei Yurievitch Gorokhov, San Diego, CA (US); Hari Sankar, San Diego, CA (US); Peer Berger, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 17/848,295

(22) Filed: Jun. 23, 2022

(65) Prior Publication Data

US 2023/0422175 A1 Dec. 28, 2023

(51) Int. Cl.
*H04M 3/00* (2024.01)
*G06N 3/02* (2006.01)
*H04L 12/66* (2006.01)
*H04M 5/00* (2006.01)
*H04W 52/02* (2009.01)

(52) U.S. Cl.
CPC .......... *H04W 52/0261* (2013.01); *G06N 3/02* (2013.01)

(58) Field of Classification Search
CPC . H04W 48/12; H04W 74/0833; H04W 60/04; H04W 48/16; H04W 80/02; H04W 28/0221; H04W 4/00; H04W 24/02; H04L 5/0053; H04L 5/0007; H04L 5/0091; H04L 1/185; H04B 7/0452; H04B 7/0695; H04B 7/0626; H04B 7/0617; H04B 7/0413; H04B 7/088
See application file for complete search history.

(56) References Cited

U.S. PATENT DOCUMENTS

2007/0195738 A1 * 8/2007 Kim ................. H04L 25/03242
370/335
2019/0182009 A1 * 6/2019 Mondal ................... H04L 5/005
(Continued)

FOREIGN PATENT DOCUMENTS

WO WO-2021015896 A1 * 1/2021 ............. G06N 20/00

OTHER PUBLICATIONS

International Search Report and Written Opinion—PCT/US2023/022128—ISA/EPO—Aug. 17, 2023.

*Primary Examiner* — Kharye Pope
(74) *Attorney, Agent, or Firm* — Qualcomm Incorporated/Seyfarth Shaw LLP

(57) ABSTRACT

A method of wireless communication by a receiver, includes predicting, with an artificial neural network, at each data block of a set of data blocks, a least complex set of demodulator parameters that will achieve a goal, based on features of a data block expected to be received. The method also includes dynamically selecting the least complex set of demodulator parameters, from multiple sets of demodulator parameters, based on the features of the data block expected to be received. The selecting occurring to prevent degradation of demodulation performance for each data block with the selected set of demodulator parameters for the data block, with respect to a more complex set of demodulator parameters.

28 Claims, 9 Drawing Sheets

(56) References Cited

U.S. PATENT DOCUMENTS

| | | |
|---|---|---|
| 2020/0293894 A1* | 9/2020 | Kwon .................... G06N 3/08 |
| 2020/0396760 A1* | 12/2020 | Yi ........................ H04L 1/1812 |
| 2022/0014950 A1* | 1/2022 | Taherzadeh Boroujeni ............... H04L 5/0053 |
| 2022/0210816 A1* | 6/2022 | Wu .................. H04W 72/0453 |
| 2022/0225133 A1* | 7/2022 | Khoshnevisan ...... H04L 5/0053 |
| 2023/0239841 A1* | 7/2023 | Zhou ...................... H04L 5/16 370/277 |
| 2023/0363041 A1* | 11/2023 | Jeon .................... H04W 76/30 |

* cited by examiner

MACHINE LEARNING (ML)-BASED DYNAMIC DEMODULATOR PARAMETER SELECTION

FIELD OF THE DISCLOSURE

The present disclosure relates generally to wireless communications, and more specifically to machine learning (ML)-based dynamic selection of demodulator parameters, such as near maximum likelihood demodulator parameters.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a receiver includes predicting, with an artificial neural network, at each data block of a set of data blocks, a least complex set of demodulator parameters that will achieve a goal, based on features of a data block expected to be received. The method also includes dynamically selecting the least complex set of demodulator parameters, from multiple sets of demodulator parameters, based on the features of the data block expected to be received. The selecting occurs to prevent degradation of demodulation performance for each data block with the selected set of demodulator parameters for the data block, with respect to a more complex set of demodulator parameters.

Other aspects of the present disclosure are directed to an apparatus. The apparatus has a memory and one or more processor(s) coupled to the memory. The processor(s) is configured to predict, with an artificial neural network, at each data block of a set of data blocks, a least complex set of demodulator parameters that will achieve a goal, based on features of a data block expected to be received. The processor(s) is also configured to dynamically select the least complex set of demodulator parameters, from a number of sets of demodulator parameters, based on the features of the data block expected to be received. The selecting occurs to prevent degradation of demodulation performance for each data block with the selected set of demodulator parameters for the data block, with respect to a more complex set of demodulator parameters.

Other aspects of the present disclosure are directed to an apparatus. The apparatus includes means for predicting, with an artificial neural network, at each data block of a set of data blocks, a least complex set of demodulator parameters that will achieve a goal, based on features of a data block expected to be received. The apparatus also includes means for dynamically selecting the least complex set of demodulator parameters, from a number of sets of demodulator parameters, based on the features of the data block expected to be received. The means for dynamically selecting prevents degradation of demodulation performance for each data block with the selected set of demodulator parameters for the data block, with respect to a more complex set of demodulator parameters.

In other aspects of the present disclosure, a non-transitory computer-readable medium with program code recorded thereon is disclosed. The program code is executed by a processor and includes program code to predict, with an artificial neural network, at each data block of a set of data blocks, a least complex set of demodulator parameters that will achieve a goal, based on features of a data block expected to be received. The program code also includes program code to dynamically select the least complex set of demodulator parameters, from a number of sets of demodulator parameters, based on the features of the data block expected to be received. The selecting prevents degradation of demodulation performance for each data block with the selected set of demodulator parameters for the data block, with respect to a more complex set of demodulator parameters.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
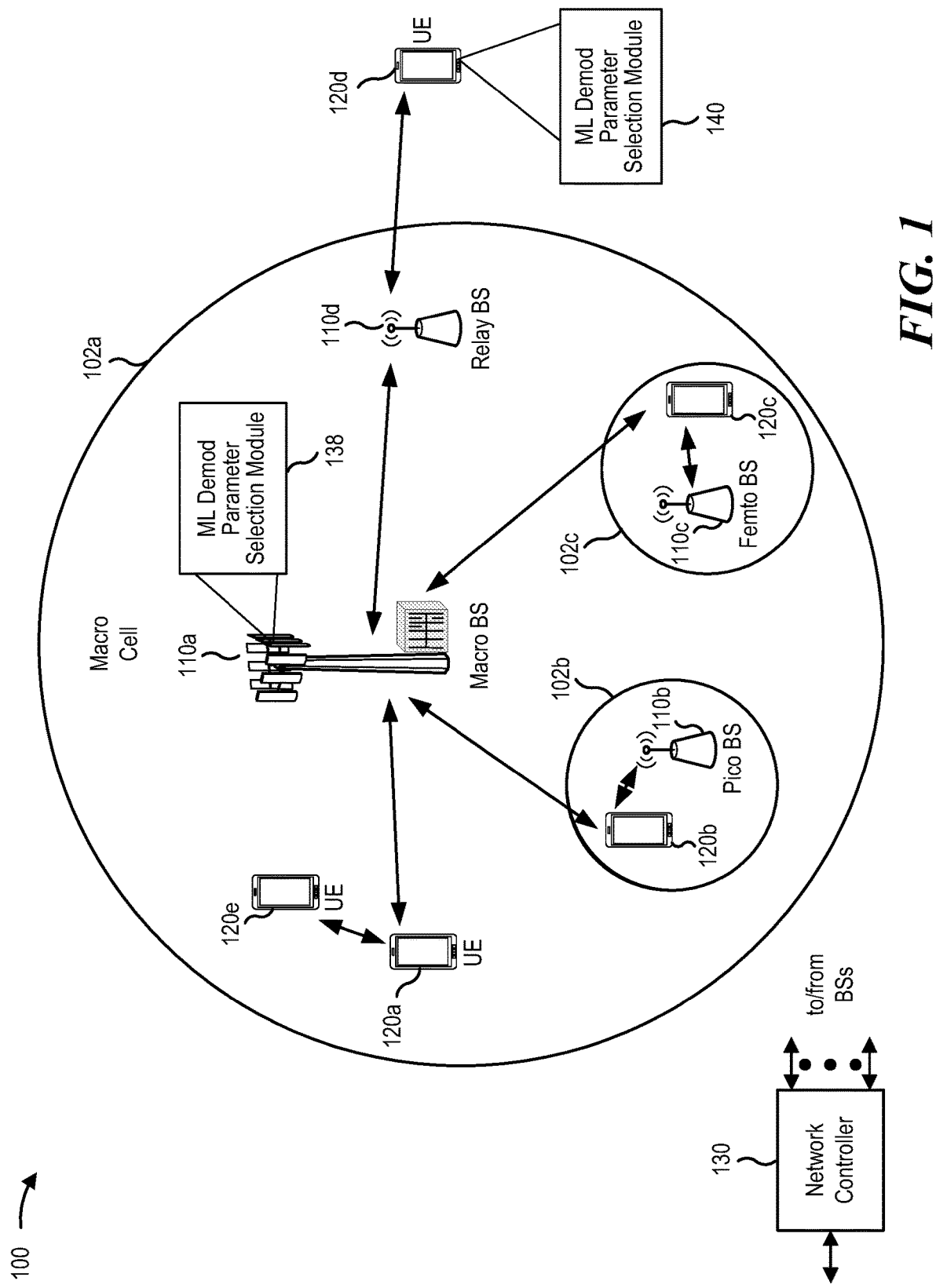
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A receiver may receive wireless signals from a transmitter and provide the received signals to demodulators for further processing. Each demodulator may condition a received signal to obtain input samples. Each demodulator may further process the input samples to obtain received symbols. A receiver may be configured with different sets of demodulator parameters, each parameter set having a different level of complexity. In some examples, the parameter sets include near maximum likelihood demodulator parameters.

The complexity of each demodulator is a dominant factor for power consumption at the receiver. Therefore, complex demodulator parameter sets may be responsible for a relatively large portion of a receiver's power consumption. In some implementations, demodulators consume approximately two-thirds of the receiver's power. Selecting a less complex parameter set decreases the power consumed by the demodulators, effectively reducing power consumption at the receiver. Thus, increasing the use of less complex demodulator parameter sets may reduce the power consumption of the receiver.

Aspects of the present disclosure are directed to saving power without spectral efficiency loss at the receiver. More specifically, in some aspects, a receiver uses machine learning (ML)-based processing to dynamically switch between demodulator parameter sets. The dynamic switching enables the receiver to switch to a less complex demodulator parameter set whenever the performance of the less complex demodulator parameter set does not degrade with respect to a more complex demodulator parameter set. That is, the receiver may switch to a less complex demodulator parameter set without harming throughput. Example demodulator parameter sets may relate to a search space and a number of layers receiving more complex processing, while performing less complex processing with remaining layers.

Aspects of the present disclosure introduce support for per block, dynamic switching of demodulator parameter sets by a receiver, such as a user equipment (UE) or base station. The per block dynamic switching saves power at the receiver, without loss of spectral efficiency. In some aspects, the receiver selects the least complex demodulator parameter set, while still maintaining a same throughput level as with a more complex demodulator parameter set. For example, the block error rate (BLER) is the same for both parameter sets. In some aspects, a machine learning module determines if a less complex demodulator parameter set can achieve the same performance level as a more complex demodulator parameter set, so that the receiver may initiate a switch when appropriate.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B, an access point, a transmit and receive point (TRP), a network node, a network entity, and/or the like. A BS can be implemented as an aggregated base station, as a disaggregated base station, an integrated access and backhaul (IAB) node, a relay node, a sidelink node, etc. The BS can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 or base station 110 may include a machine learning (ML) demodulator (demod) parameter selection module 138, 140. For brevity, only one UE 120*d* and one base station 110*a* is shown as including the ML demodulation parameter selection module 138, 140. The ML demodulation parameter selection module 138, 140 may predict, with an artificial neural network, at each data block of a set of data blocks, a least complex set of demodulator parameters that will achieve a goal, based on features of a data block expected to be received. The ML demodulation parameter selection module 138, 140 may also dynamically select the least complex set of demodulator parameters, from multiple sets of demodulator parameters, based on the features of the data block expected to be received. The selecting prevents degradation of demodulation performance for each data block with the selected set of demodulator parameters for the data block, with respect to a more complex set of demodulator parameters.

As indicated above, FIG. 1 is provided merely as an example. Other examples may differ from what is described with regard to FIG. 1.

Figure 2:
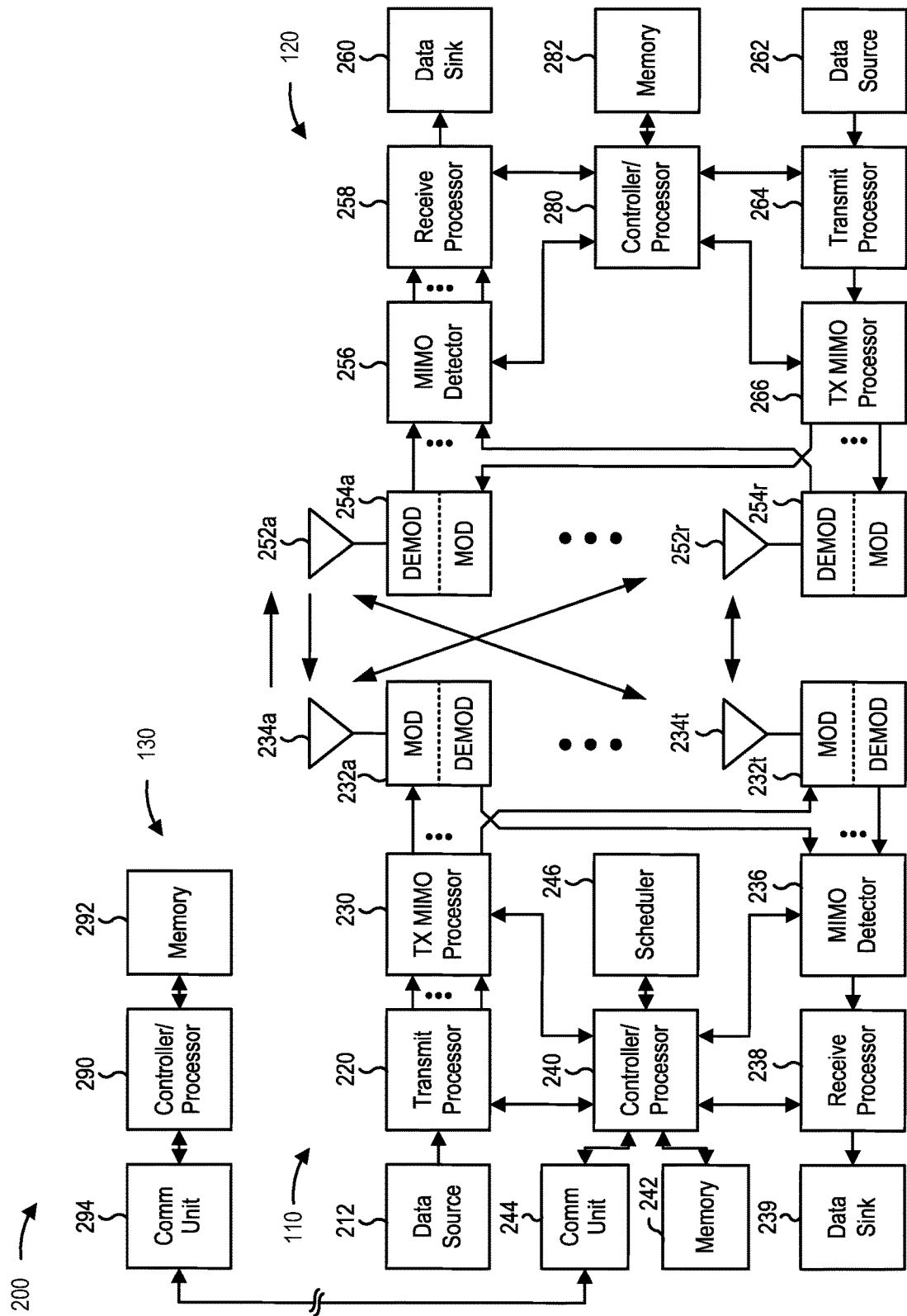
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T>1 and R>1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for demodulator parameter selection, as described in more detail elsewhere. For example, the controller/processor 240 of the base station 110, the controller/processor 280 of the UE 120, and/or any other component(s) of FIG. 2 may perform or direct operations of, for example, the processes of FIGS. 7-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120, base station 110, or component(s) of a base station may include means for predicting and means for dynamically selecting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (mod) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
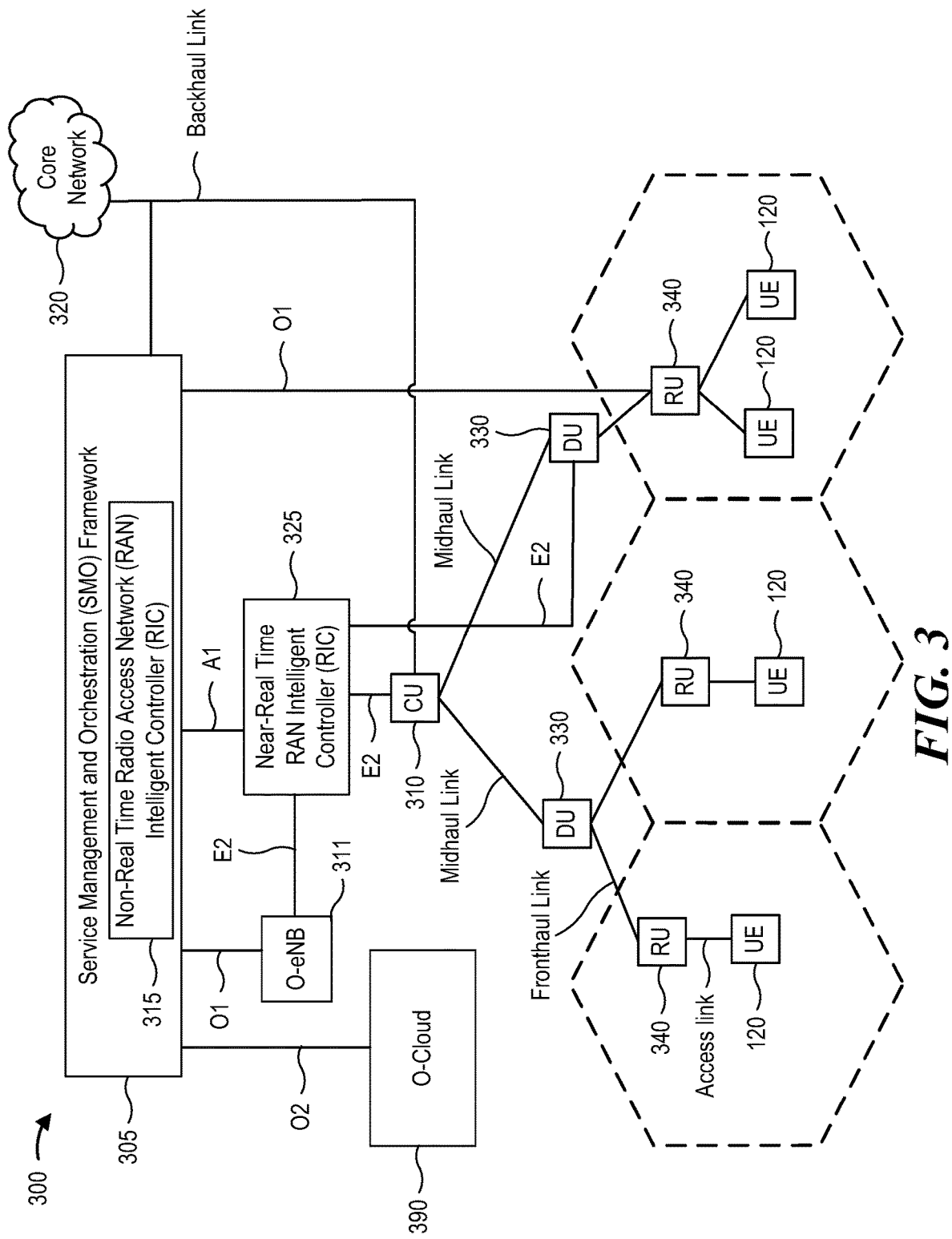
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration.

The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the Non-RT RIC 315 or the near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
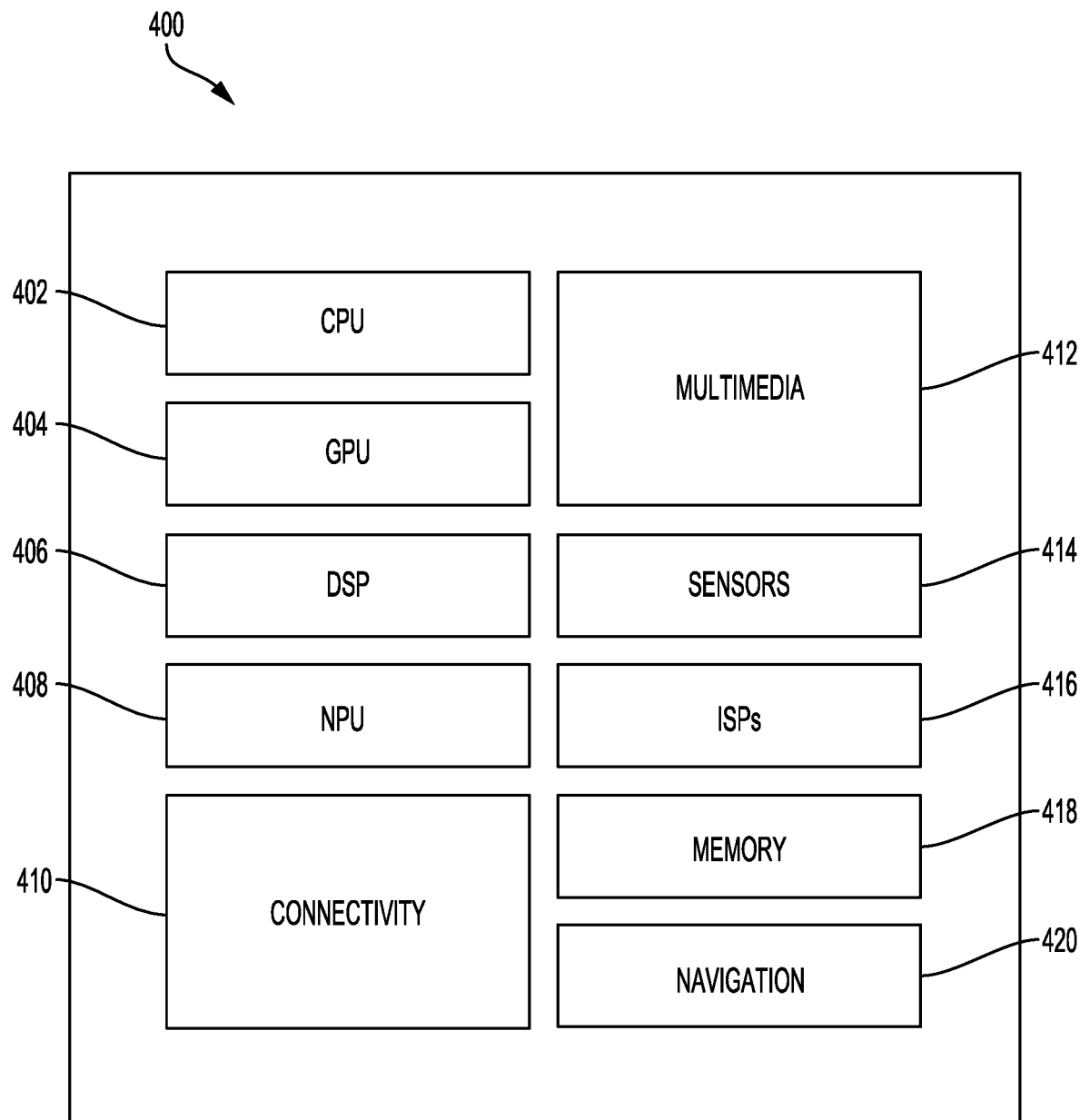
FIG. 4 illustrates an example implementation of designing a neural network using a system-on-a-chip (SOC), including a general-purpose processor, in accordance with certain aspects of the present disclosure.

FIG. 4 illustrates an example implementation of a system-on-a-chip (SOC) 400, which may include a central processing unit (CPU) 402 or a multi-core CPU configured for generating gradients for neural network training, in accordance with certain aspects of the present disclosure. The SOC 400 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 408, in a memory block associated with a CPU 402, in a memory block associated with a graphics processing unit (GPU) 404, in a memory block associated with a digital signal processor (DSP) 406, in a memory block 418, or may be distributed across multiple blocks. Instructions executed at the CPU 402 may be loaded from a program memory associated with the CPU 402 or may be loaded from a memory block 418.

The SOC 400 may also include additional processing blocks tailored to specific functions, such as a GPU 404, a DSP 406, a connectivity block 410, which may include fifth generation (5G) connectivity, fourth generation long term evolution (4G LTE) connectivity, Wi-Fi connectivity, USB connectivity, Bluetooth connectivity, and the like, and a multimedia processor 412 that may, for example, detect and recognize gestures. In one implementation, the NPU is implemented in the CPU, DSP, and/or GPU. The SOC 400 may also include a sensor processor 414, image signal processors (ISPs) 416, and/or navigation module 420, which may include a global positioning system.

The SOC 400 may be based on an ARM instruction set. In aspects of the present disclosure, the instructions loaded into the general-purpose processor 402 may comprise code to predict, with an artificial neural network, at each data block of a set of data blocks, a least complex set of demodulator parameters that will achieve a goal, based on features of a data block expected to be received. The instructions loaded into the general-purpose processor 402 may also comprise code to dynamically select the least complex set of demodulator parameters based on the features of the data block expected to be received. The selecting prevents degradation of demodulation performance for each data block with the selected set of demodulator parameters for the data block, with respect to a more complex set of demodulator parameters.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 5A:
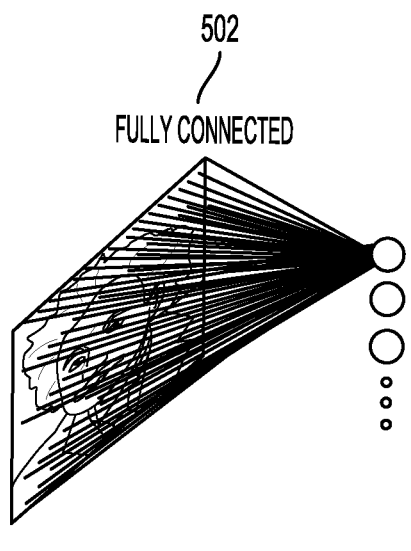
FIGS. 5A, 5B, and 5C are diagrams illustrating a neural network, in accordance with aspects of the present disclosure.
Figure 5B:
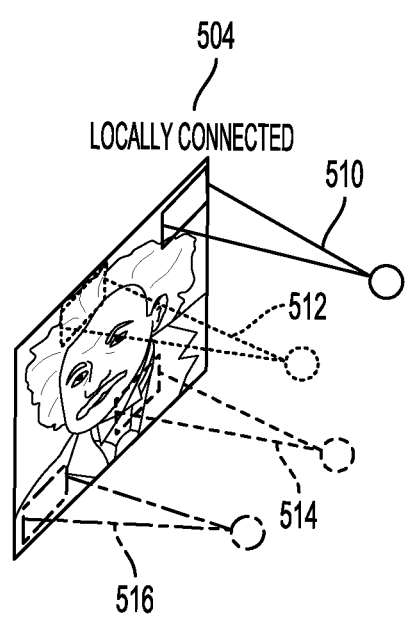

The connections between layers of a neural network may be fully connected or locally connected. FIG. 5A illustrates an example of a fully connected neural network 502. In a fully connected neural network 502, a neuron in a first layer may communicate its output to every neuron in a second layer, so that each neuron in the second layer will receive input from every neuron in the first layer. FIG. 5B illustrates an example of a locally connected neural network 504. In a locally connected neural network 504, a neuron in a first layer may be connected to a limited number of neurons in the second layer. More generally, a locally connected layer of the locally connected neural network 504 may be configured so that each neuron in a layer will have the same or a similar connectivity pattern, but with connections strengths that may have different values (e.g., 510, 512, 514, and 516). The locally connected connectivity pattern may give rise to spatially distinct receptive fields in a higher layer, because the higher layer neurons in a given region may receive inputs that are tuned through training to the properties of a restricted portion of the total input to the network.

Figure 5C:
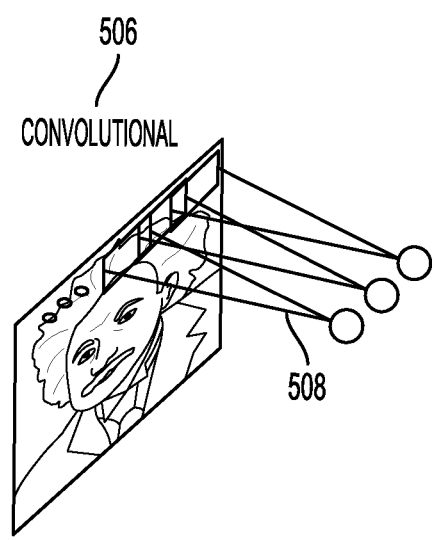

One example of a locally connected neural network is a convolutional neural network. FIG. 5C illustrates an example of a convolutional neural network 506. The convolutional neural network 506 may be configured such that the connection strengths associated with the inputs for each neuron in the second layer are shared (e.g., 508). Convolutional neural networks may be well suited to problems in which the spatial location of inputs is meaningful.

Figure 5D:
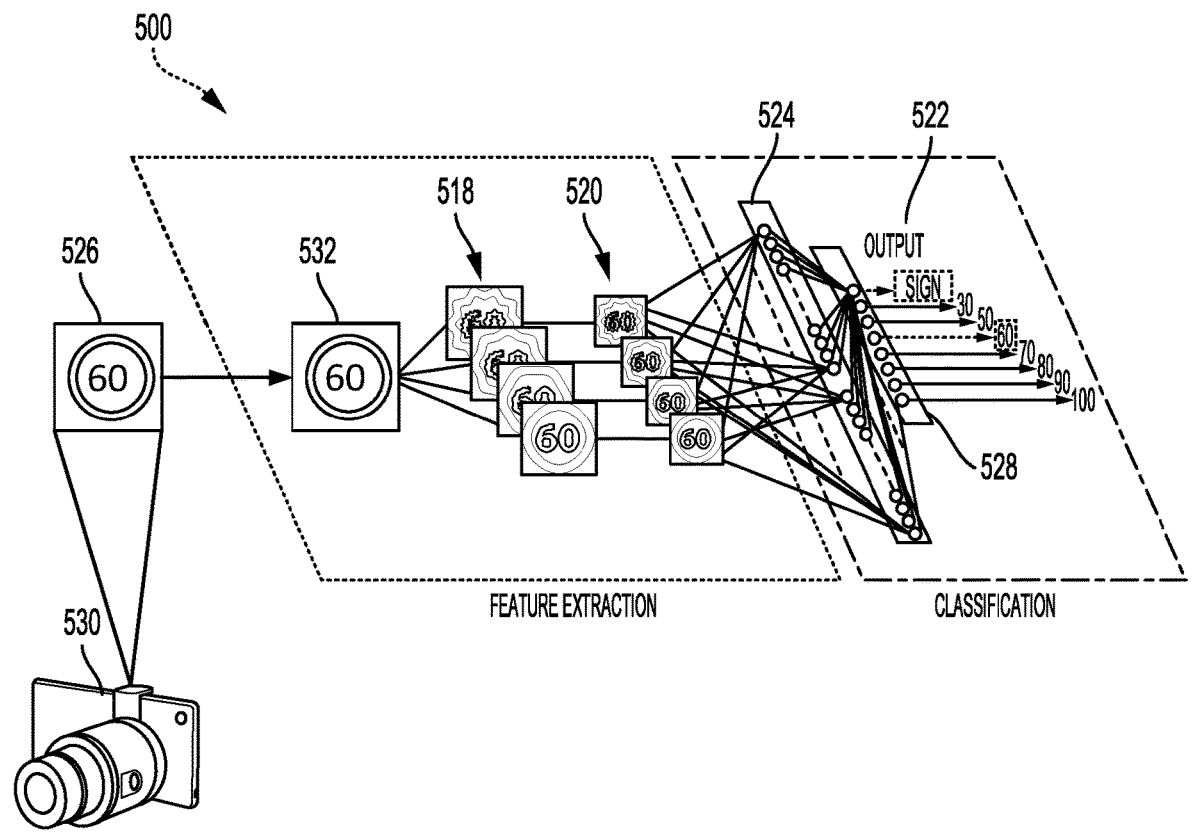
FIG. 5D is a diagram illustrating an exemplary deep convolutional network (DCN), in accordance with aspects of the present disclosure.

One type of convolutional neural network is a deep convolutional network (DCN). FIG. 5D illustrates a detailed example of a DCN 500 designed to recognize visual features from an image 526 input from an image capturing device 530, such as a car-mounted camera. The DCN 500 of the current example may be trained to identify traffic signs and a number provided on the traffic sign. Of course, the DCN 500 may be trained for other tasks, such as identifying lane markings or identifying traffic lights.

The DCN 500 may be trained with supervised learning. During training, the DCN 500 may be presented with an image, such as the image 526 of a speed limit sign, and a forward pass may then be computed to produce an output 522. The DCN 500 may include a feature extraction section and a classification section. Upon receiving the image 526, a convolutional layer 532 may apply convolutional kernels (not shown) to the image 526 to generate a first set of feature maps 518. As an example, the convolutional kernel for the convolutional layer 532 may be a 5×5 kernel that generates 28×28 feature maps. In the present example, because four different feature maps are generated in the first set of feature maps 518, four different convolutional kernels were applied to the image 526 at the convolutional layer 532. The convolutional kernels may also be referred to as filters or convolutional filters.

The first set of feature maps 518 may be subsampled by a max pooling layer (not shown) to generate a second set of feature maps 520. The max pooling layer reduces the size of the first set of feature maps 518. That is, a size of the second set of feature maps 520, such as 14×14, is less than the size of the first set of feature maps 518, such as 28×28. The reduced size provides similar information to a subsequent layer while reducing memory consumption. The second set of feature maps 520 may be further convolved via one or more subsequent convolutional layers (not shown) to generate one or more subsequent sets of feature maps (not shown).

In the example of FIG. 5D, the second set of feature maps 520 is convolved to generate a first feature vector 524. Furthermore, the first feature vector 524 is further convolved to generate a second feature vector 528. Each feature of the second feature vector 528 may include a number that corresponds to a possible feature of the image 526, such as "sign," "60," and "100." A softmax function (not shown) may convert the numbers in the second feature vector 528 to a probability. As such, an output 522 of the DCN 500 is a probability of the image 526 including one or more features.

In the present example, the probabilities in the output 522 for "sign" and "60" are higher than the probabilities of the others of the output 522, such as "30," "40," "50," "70," "80," "90," and "100". Before training, the output 522 produced by the DCN 500 is likely to be incorrect. Thus, an error may be calculated between the output 522 and a target output. The target output is the ground truth of the image 526 (e.g., "sign" and "60"). The weights of the DCN 500 may then be adjusted so the output 522 of the DCN 500 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 526) and a forward pass through the network may yield an output 522 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 6:
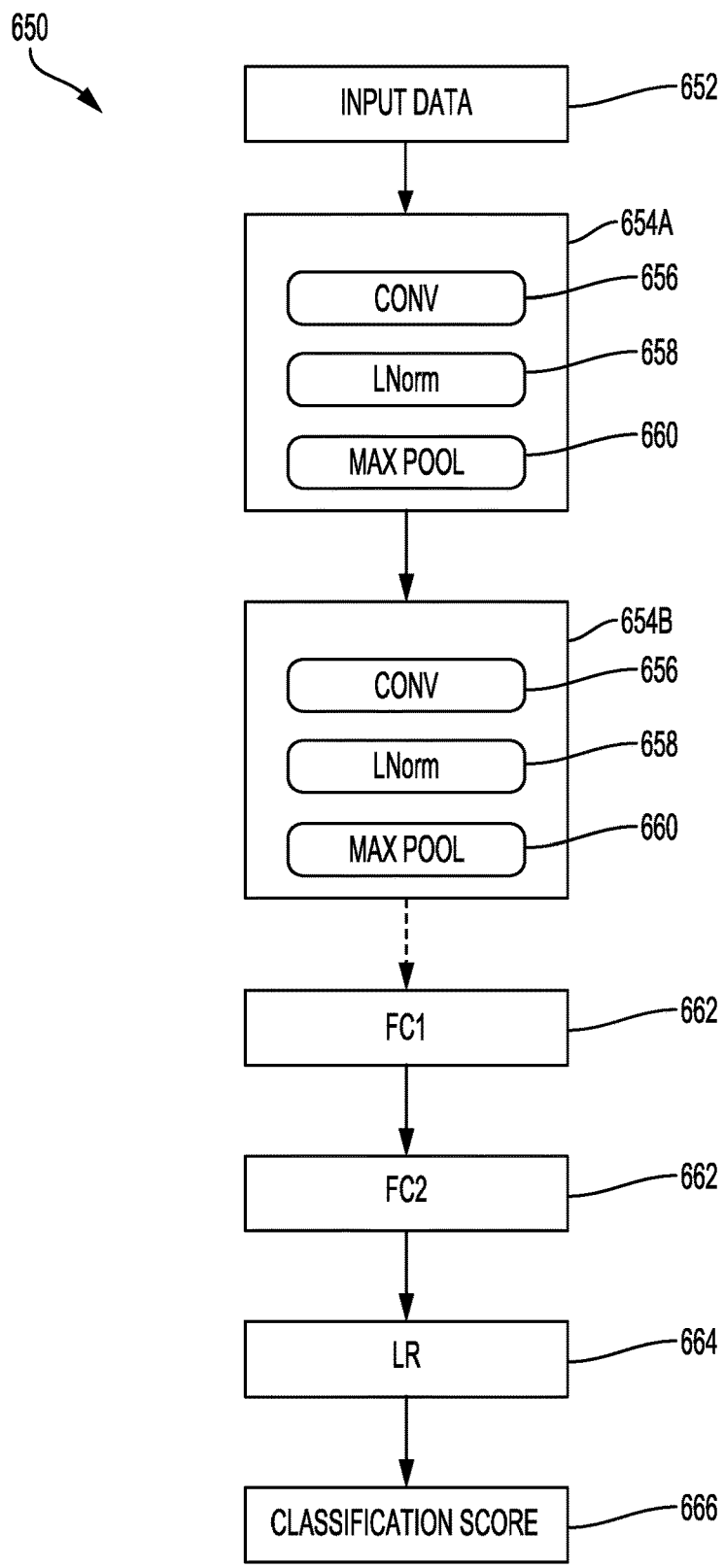
FIG. 6 is a block diagram illustrating an exemplary deep convolutional network (DCN), in accordance with aspects of the present disclosure.

FIG. 6 is a block diagram illustrating a deep convolutional network 650. The deep convolutional network 650 may include multiple different types of layers based on connectivity and weight sharing. As shown in FIG. 6, the deep convolutional network 650 includes the convolution blocks 654A, 654B. Each of the convolution blocks 654A, 654B may be configured with a convolution layer (CONV) 656, a normalization layer (LNorm) 658, and a max pooling layer (MAX POOL) 660.

The convolution layers 656 may include one or more convolutional filters, which may be applied to the input data to generate a feature map. Although only two of the convolution blocks 654A, 654B are shown, the present disclosure is not so limiting, and instead, any number of the convolution blocks 654A, 654B may be included in the deep convolutional network 650 according to design preference. The normalization layer 658 may normalize the output of the convolution filters. For example, the normalization layer 658 may provide whitening or lateral inhibition. The max pooling layer 660 may provide down sampling aggregation over space for local invariance and dimensionality reduction.

The parallel filter banks, for example, of a deep convolutional network may be loaded on a CPU 402 or GPU 404 of an SOC 400 to achieve high performance and low power consumption. In alternative embodiments, the parallel filter banks may be loaded on the DSP 406 or an ISP 416 of an SOC 400. In addition, the deep convolutional network 650 may access other processing blocks that may be present on the SOC 400, such as sensor processor 414 and navigation module 420, dedicated, respectively, to sensors and navigation.

The deep convolutional network 650 may also include one or more fully connected layers 662 (FC1 and FC2). The deep convolutional network 650 may further include a logistic regression (LR) layer 664. Between each layer 656, 658, 660, 662, 664 of the deep convolutional network 650 are weights (not shown) that are to be updated. The output of each of the layers (e.g., 656, 658, 660, 662, 664) may serve as an input of a succeeding one of the layers (e.g., 656,

658, 660, 662, 664) in the deep convolutional network 650 to learn hierarchical feature representations from input data 652 (e.g., images, audio, video, sensor data and/or other input data) supplied at the first of the convolution blocks 654A. The output of the deep convolutional network 650 is a classification score 666 for the input data 652. The classification score 666 may be a set of probabilities, where each probability is the probability of the input data, including a feature from a set of features.

As indicated above, FIGS. 4-6 are provided as examples. Other examples may differ from what is described with respect to FIGS. 4-6.

As discussed above, a receiver may receive wireless signals from a transmitter and provide the received signals to demodulators. Each demodulator may condition (e.g., filter, amplify, downconvert, and/or digitize) a received signal to obtain input samples. Each demodulator may further process the input samples (e.g., for OFDM and/or the like) to obtain received symbols. The receiver may be configured with a set of demodulator parameter sets, each demodulator parameter set having a different level of complexity. In some examples, the parameter sets include near maximum likelihood demodulator parameters.

The complexity of each demodulator is a dominant factor for power consumption at the receiver. Therefore, complex demodulator parameter sets may be responsible for a relatively large portion of a receiver's power consumption. In some implementations, demodulators consume approximately two-thirds of the receiver's power. Selecting a less complex parameter set decreases the power consumed by the demodulators, effectively reducing power consumption at the receiver. Thus, increasing the use of less complex demodulator parameter sets may reduce the power consumption of the receiver.

Aspects of the present disclosure are directed to saving power at the receiver without spectral efficiency loss at the receiver. More specifically, in some aspects, a receiver uses machine learning (ML)-based processing for dynamic switching between demodulator parameter sets. The dynamic switching enables the receiver to switch to a less complex demodulator parameter set whenever the performance of the less complex demodulator parameter set does not degrade with respect to a more complex demodulator parameter set. That is, the receiver may switch to a less complex demodulator parameter set without harming throughput. Coefficients of a machine learning model may be dynamically updated by a learning procedure performed at the receiver. It is noted that although the description primarily refers to dynamically switching demodulator parameter sets at a UE receiver, the concepts of the present disclosure are also applicable at a base station (gNB) receiver, for power savings at the base station.

Example demodulator parameter sets may relate to a search space and a layer order. A search space is associated with a constellation size. Different demodulator parameter sets may specify whether or not to search across all symbol combinations in the search space. Skipping symbols may save power. Thus, demodulator parameter sets that reduce the number of symbols to search in each layer are less complex and may reduce receiver power consumption. The parameters related to layer order may also affect complexity. A layer may be referred to as a transmission stream. In one example, a signal is received from two layers. Which layer is processed first may affect efficiency if the layers are not independent from one another. A layer with a higher signal-to-interference plus noise ratio (SINR) can be processed first and then the less complex layer may be processed. The less complex layer may be subject to interlayer interference, for example. Moreover, layer order selection may also improve the spectral efficiency. In a specific example related to QR decomposition, the demodulation parameters may indicate a number of times to perform the QR decomposition. The number of times can range from once up to the total number of layers.

Figure 7:
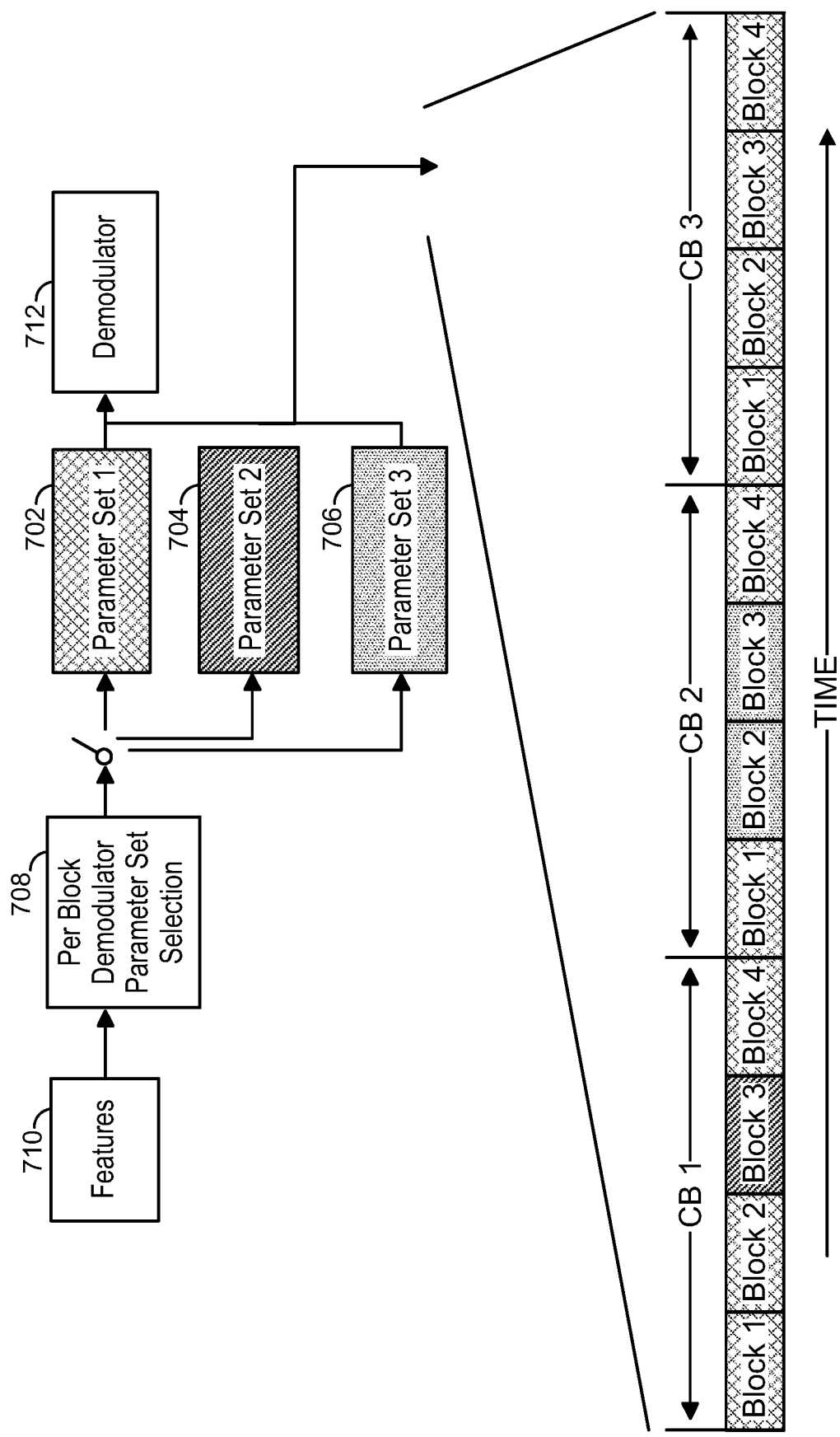
FIG. 7 is block diagram illustrating per block demodulator parameter selection, in accordance with aspects of the present disclosure.

FIG. 7 is block diagram illustrating per block demodulator parameter selection, in accordance with aspects of the present disclosure. In the example of FIG. 7, a first demodulator parameter set 702 is a lowest complexity demodulator parameter set. A second demodulator parameter set 704 is a medium complexity demodulator parameter set, and a third demodulator parameter set 706 is a highest complexity demodulator parameter set. Examples for parameters sets include:

Set 1: search space—9 symbols, 1 QR decomposition.
Set 2: search space—16 symbols, 2 QR decompositions.
Set 3: search space—64 symbols, 4 QR decompositions.

According to aspects of the present disclosure, machine learning may be employed to assist with demodulator parameter set selection. A machine learning model 708 (e.g., a classifier) may receive one or more input features 710 to help with the demodulator parameter set selection. An example input feature 710 is a signal-to-noise ratio (SNR) or another metric that represents the channel state. Another input feature 710 may be an antenna correlation metric. In this example, the input feature 710 (e.g., antenna correlation) may be used to predict if a particular block needs a specific type of parameter set such that demodulation and decoding will pass CRC. By applying the trained machine learning coefficients to the input features 710, the machine learning model 708 calculates an internal state to enable generating an output, such as the selected demodulator parameter set. After a parameter set 702, 704, 706 is selected, a demodulator 712 demodulates the signal with the selected parameter set 702, 704, or 706. In some aspects, the machine learning model 708 is pre-trained with static coefficients. In other aspects, the coefficients of the machine learning model 708 are dynamically updated with online training.

An example of dynamic demodulator parameter set selection is now described with a block size equal to ¼ code block. In the example shown in FIG. 7, the machine learning model 708 selects the first demodulator parameter set 702 for the first two blocks (e.g., Block 1 and Block 2) of the first code block CB 1. The machine learning model 708 selects the second demodulator parameter set 704 for the third block (e.g., Block 3) of the first code block CB 1. The machine learning model 708 selects the first demodulator parameter set 702 for the last block (e.g., Block 4) of the first code block CB 1. For the second code block CB 2, the machine learning model 708 selects the first demodulator parameter set 702 for the first block (e.g., Block 1). The machine learning model 708 selects the third demodulator parameter set 706 for the next two blocks (e.g., Block 2 and Block 3) of the second code block CB 2. The machine learning model 708 again selects the first demodulator parameter set 702 for the fourth block (e.g., Block 4) of the second code block CB 2, as well as for all four blocks (e.g., Blocks 1-4) of the third code block CB 3.

Aspects of the present disclosure introduce support for per block, dynamic switching of demodulator parameter sets by a receiver, such as a UE or base station. The per block dynamic demodulator parameter set switching saves power at the receiver, without loss of spectral efficiency. In some aspects, the receiver selects the least complex demodulator parameter set, while still maintaining a same throughput level as with a more complex demodulator parameter set. In some aspects, a machine learning module determines if a less complex demodulator parameter set can achieve the same performance level as a performance level achieved by a more complex demodulator parameter set, so that the receiver may initiate a switch when appropriate. That is, the machine learning module may predict if the less complex demodulator parameter set can achieve a goal. In other examples, the goal may be maintaining performance within a first threshold amount relative to performance of a more complex demodulator parameter set when a second threshold amount of power savings is achieved relative to power consumed with the more complex demodulator parameter set. Some of the parameter set selections, such as layer order, can improve the spectral efficiency.

Figure 8:
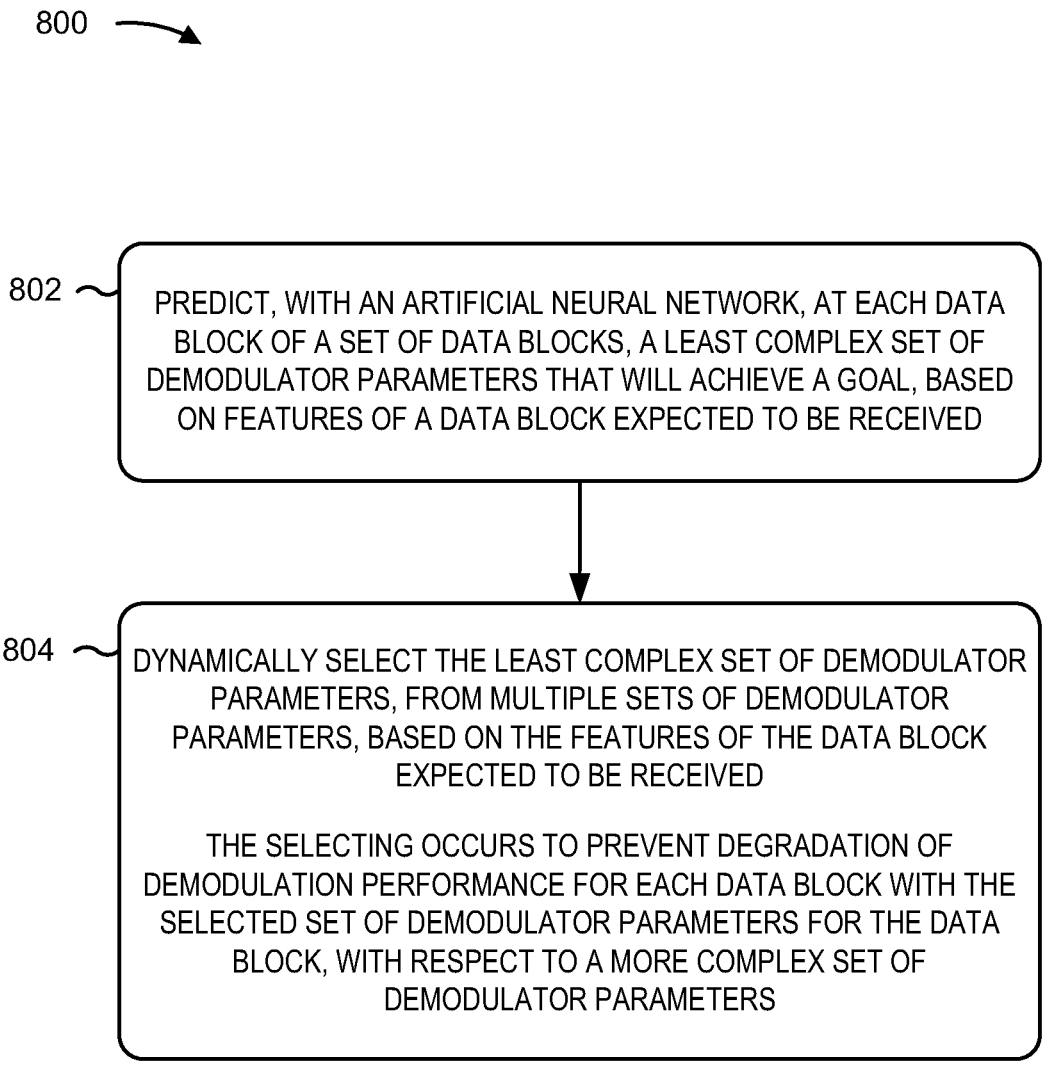
FIG. 8 is a flow diagram illustrating an example process performed, for example, by a receiver, in accordance with various aspects of the present disclosure.

FIG. 8 is a flow diagram illustrating an example process 800 performed, for example, by a receiver, in accordance with various aspects of the present disclosure. The example process 800 is an example of machine learning (ML)-based dynamic selection of demodulator parameters. In some aspects, the process 800 may include predicting, with an artificial neural network, at each data block of a set of data blocks, a least complex set of demodulator parameters that will achieve a goal, based on features of a data block expected to be received (block 802). For example, the user equipment (UE) or base station (e.g., using the controller/processor 280 and/or 240, memory 282 and/or 242, and/or the like) may predict the least complex set of demodulator parameters. The receiving device may be a user equipment (UE), a base station, or a component of a base station. The data block may be a resource element (RE), a sub-code block (CB), a CB, or a transport block. In some aspects, the goal is maintaining performance relative to a more complex set of demodulator parameters. In other aspects, the goal is maintaining performance within a first threshold amount relative to performance with a more complex set of demodulator parameters when a second threshold amount of power savings is achieved relative to power consumed with the more complex set of demodulator parameters.

In some aspects, the process 800 may include dynamically selecting the least complex set of demodulator parameters, from multiple sets of demodulator parameters, based on the features of the data block expected to be received. The selecting occurs to prevent degradation of demodulation performance for each data block with the selected set of demodulator parameters for the data block, with respect to a more complex set of demodulator parameters (block 804). For example, the user equipment (UE) or base station (e.g., using the controller/processor 280 and/or 240, memory 282 and/or 242, and/or the like) may select the least complex set of demodulator parameters. The sets of demodulation parameters may define a search space, and/or a quantity of layers to be processed with higher complexity.

EXAMPLE ASPECTS

Aspect 1: A method of wireless communication by a receiving device, comprising: predicting, with an artificial neural network, at each data block of a set of data blocks, a least complex set of demodulator parameters that will achieve a goal, based on features of a data block expected to be received; and dynamically selecting the least complex set of demodulator parameters, from a plurality of sets of demodulator parameters, based on the features of the data block expected to be received, the selecting occurring to prevent degradation of demodulation performance for each data block with the selected set of demodulator parameters for the data block, with respect to a more complex set of demodulator parameters.

Aspect 2: The method of Aspect 1, in which the data block is one of a resource element (RE), a sub-code block (CB), a CB, or a transport block.

Aspect 3: The method of Aspect 1 or 2, in which the plurality of sets of demodulation parameters define a search space, and/or a quantity of layers to be processed with higher complexity.

Aspect 4: The method of any of the preceding Aspects, in which the receiving device is a user equipment (UE).

Aspect 5: The method of any of the Aspects 1-3, in which the receiving device is a base station.

Aspect 6: The method of any of the preceding Aspects, in which the goal comprises maintaining performance relative to the more complex set of demodulator parameters.

Aspect 7: The method of any of the Aspects 1-5, in which the goal comprises maintaining performance within a first threshold amount relative to performance with the more complex set of demodulator parameters when a second threshold amount of power savings is achieved relative to power consumed with the more complex set of demodulator parameters.

Aspect 8: An apparatus for wireless communication by a receiving device, comprising: a memory; and at least one processor coupled to the memory, the at least one processor configured: to predict with an artificial neural network, at each data block of a set of data blocks, a least complex set of demodulator parameters that will achieve a goal, based on features of a data block expected to be received; and to dynamically select the least complex set of demodulator parameters, from a plurality of sets of demodulator parameters, based on the features of the data block expected to be received, the processor configured to dynamically select to prevent degradation of demodulation performance for each data block with the selected set of demodulator parameters for the data block, with respect to a more complex set of demodulator parameters.

Aspect 9: The apparatus of Aspect 8, in which the data block is one of a resource element (RE), a sub-code block (CB), a CB, or a transport block.

Aspect 10: The apparatus of Aspect 8 or 9, in which the plurality of sets of demodulation parameters define a search space, and/or a quantity of layers to be processed with higher complexity.

Aspect 11: The apparatus of any of the Aspects 8-10, in which the receiving device is a user equipment (UE).

Aspect 12: The apparatus of any of the Aspects 8-10, in which the receiving device is a base station.

Aspect 13: The apparatus of any of the Aspects 8-12, in which the goal comprises maintaining performance relative to the more complex set of demodulator parameters.

Aspect 14: The apparatus of any of the Aspects 8-12, in which the goal comprises maintaining performance within a first threshold amount relative to performance with the more complex set of demodulator parameters when a second threshold amount of power savings is achieved relative to power consumed with the more complex set of demodulator parameters.

Aspect 15: An apparatus for wireless communication by a receiving device, comprising: means for predicting, with an artificial neural network, at each data block of a set of data blocks, a least complex set of demodulator parameters that will achieve a goal, based on features of a data block expected to be received; and means for dynamically selecting the least complex set of demodulator parameters, from a plurality of sets of demodulator parameters, based on the features of the data block expected to be received, the means for dynamically selecting preventing degradation of demodulation performance for each data block with the selected set of demodulator parameters for the data block, with respect to a more complex set of demodulator parameters.

Aspect 16: The apparatus of Aspect 15, in which the data block is one of a resource element (RE), a sub-code block (CB), a CB, or a transport block.

Aspect 17: The apparatus of Aspect 15 or 16, in which the plurality of sets of demodulation parameters define a search space, and/or a quantity of layers to be processed with higher complexity.

Aspect 18: The apparatus of any of the Aspects 15-17, in which the receiving device is a user equipment (UE).

Aspect 19: The apparatus of any of the Aspects 15-17, in which the receiving device is a base station.

Aspect 20: The apparatus of any of the Aspects 15-19, in which the goal comprises maintaining performance relative to the more complex set of demodulator parameters.

Aspect 21: The apparatus of any of the Aspects 15-19, in which the goal comprises maintaining performance within a first threshold amount relative to performance with the more complex set of demodulator parameters when a second threshold amount of power savings is achieved relative to power consumed with the more complex set of demodulator parameters.

Aspect 22: A non-transitory computer-readable medium having program code recorded thereon, the program code executed by a processor of a receiving device and comprising: program code to predict, with an artificial neural network, at each data block of a set of data blocks, a least complex set of demodulator parameters that will achieve a goal, based on features of a data block expected to be received; and program code to dynamically select the least complex set of demodulator parameters, from a plurality of sets of demodulator parameters, based on the features of the data block expected to be received, the program code to dynamically select preventing degradation of demodulation performance for each data block with the selected set of demodulator parameters for the data block, with respect to a more complex set of demodulator parameters.

Aspect 23: The non-transitory computer-readable medium of Aspect 22, in which the data block is one of a resource element (RE), a sub-code block (CB), a CB, or a transport block.

Aspect 24: The non-transitory computer-readable medium of Aspect 22 or 23, in which the plurality of sets of demodulation parameters define a search space, and/or a quantity of layers to be processed with higher complexity.

Aspect 25: The non-transitory computer-readable medium of any of the Aspects 22-24, in which the receiving device is a user equipment (UE).

Aspect 26: The non-transitory computer-readable medium of any of the Aspects 22-24, in which the receiving device is a base station.

Aspect 27: The non-transitory computer-readable medium of any of the Aspects 22-26, in which the goal comprises maintaining performance relative to the more complex set of demodulator parameters.

Aspect 28: The non-transitory computer-readable medium of any of the Aspects 22-26, in which the goal comprises maintaining performance within a first threshold amount relative to performance with the more complex set of demodulator parameters when a second threshold amount of power savings is achieved relative to power consumed with the more complex set of demodulator parameters.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a receiving device, comprising:
predicting, with an artificial neural network, at each data block of a set of data blocks, a least complex set of demodulator parameters that will achieve a goal, based on features of a data block expected to be received; and
dynamically selecting the least complex set of demodulator parameters, from a plurality of sets of demodulator parameters, based on the features of the data block expected to be received, the selecting occurring to prevent degradation of demodulation performance for each data block with the selected set of demodulator parameters for the data block, with respect to a more complex set of demodulator parameters, the plurality of sets of demodulation parameters defining at least one of a search space, a processing sequence for a quantity of layers, or a combination of the search space and processing sequence.

2. The method of claim 1, in which the data block is one of a resource element (RE), a sub-code block (CB), a CB, or a transport block.

3. The method of claim 1, in which the plurality of sets of demodulation parameters define the quantity of layers to be processed with higher complexity.

4. The method of claim 1, in which the receiving device is a user equipment (UE).

5. The method of claim 1, in which the receiving device is a base station.

6. The method of claim 1, in which the goal comprises maintaining performance relative to the more complex set of demodulator parameters.

7. The method of claim 1, in which the goal comprises maintaining performance within a first threshold amount relative to performance with the more complex set of demodulator parameters when a second threshold amount of power savings is achieved relative to power consumed with the more complex set of demodulator parameters.

8. An apparatus for wireless communication by a receiving device, comprising:
    a memory; and
    at least one processor coupled to the memory, the at least one processor configured:
        to predict with an artificial neural network, at each data block of a set of data blocks, a least complex set of demodulator parameters that will achieve a goal, based on features of a data block expected to be received; and
        to dynamically select the least complex set of demodulator parameters, from a plurality of sets of demodulator parameters, based on the features of the data block expected to be received, the processor configured to dynamically select to prevent degradation of demodulation performance for each data block with the selected set of demodulator parameters for the data block, with respect to a more complex set of demodulator parameters, the plurality of sets of demodulation parameters defining at least one of a search space, a processing sequence for a quantity of layers, or a combination of the search space and processing sequence.

9. The apparatus of claim 8, in which the data block is one of a resource element (RE), a sub-code block (CB), a CB, or a transport block.

10. The apparatus of claim 8, in which the plurality of sets of demodulation parameters define the quantity of layers to be processed with higher complexity.

11. The apparatus of claim 8, in which the receiving device is a user equipment (UE).

12. The apparatus of claim 8, in which the receiving device is a base station.

13. The apparatus of claim 8, in which the goal comprises maintaining performance relative to the more complex set of demodulator parameters.

14. The apparatus of claim 8, in which the goal comprises maintaining performance within a first threshold amount relative to performance with the more complex set of demodulator parameters when a second threshold amount of power savings is achieved relative to power consumed with the more complex set of demodulator parameters.

15. An apparatus for wireless communication by a receiving device, comprising:
    means for predicting, with an artificial neural network, at each data block of a set of data blocks, a least complex set of demodulator parameters that will achieve a goal, based on features of a data block expected to be received; and
    means for dynamically selecting the least complex set of demodulator parameters, from a plurality of sets of demodulator parameters, based on the features of the data block expected to be received, the means for dynamically selecting preventing degradation of demodulation performance for each data block with the selected set of demodulator parameters for the data block, with respect to a more complex set of demodulator parameters, the plurality of sets of demodulation parameters defining at least one of a search space, a processing sequence for a quantity of layers, or a combination of the search space and processing sequence.

16. The apparatus of claim 15, in which the data block is one of a resource element (RE), a sub-code block (CB), a CB, or a transport block.

17. The apparatus of claim 15, in which the plurality of sets of demodulation parameters define the quantity of layers to be processed with higher complexity.

18. The apparatus of claim 15, in which the receiving device is a user equipment (UE).

19. The apparatus of claim 15, in which the receiving device is a base station.

20. The apparatus of claim 15, in which the goal comprises maintaining performance relative to the more complex set of demodulator parameters.

21. The apparatus of claim 15, in which the goal comprises maintaining performance within a first threshold amount relative to performance with the more complex set of demodulator parameters when a second threshold amount of power savings is achieved relative to power consumed with the more complex set of demodulator parameters.

22. A non-transitory computer-readable medium having program code recorded thereon, the program code executed by a processor of a receiving device and comprising:
    program code to predict, with an artificial neural network, at each data block of a set of data blocks, a least complex set of demodulator parameters that will achieve a goal, based on features of a data block expected to be received; and
    program code to dynamically select the least complex set of demodulator parameters, from a plurality of sets of demodulator parameters, based on the features of the data block expected to be received, the program code to dynamically select preventing degradation of demodulation performance for each data block with the selected set of demodulator parameters for the data block, with respect to a more complex set of demodulator parameters, the plurality of sets of demodulation parameters defining at least one of a search space, a processing sequence for a quantity of layers, or a combination of the search space and processing sequence.

23. The non-transitory computer-readable medium of claim 22, in which the data block is one of a resource element (RE), a sub-code block (CB), a CB, or a transport block.

24. The non-transitory computer-readable medium of claim 22, in which the plurality of sets of demodulation parameters define the quantity of layers to be processed with higher complexity.

25. The non-transitory computer-readable medium of claim 22, in which the receiving device is a user equipment (UE).

26. The non-transitory computer-readable medium of claim 22, in which the receiving device is a base station.

27. The non-transitory computer-readable medium of claim 22, in which the goal comprises maintaining performance relative to the more complex set of demodulator parameters.

28. The non-transitory computer-readable medium of claim 22, in which the goal comprises maintaining performance within a first threshold amount relative to performance with the more complex set of demodulator parameters when a second threshold amount of power savings is achieved relative to power consumed with the more complex set of demodulator parameters.

* * * * *